United States Patent
Stewart

(10) Patent No.: US 9,807,213 B2
(45) Date of Patent: Oct. 31, 2017

(54) APPARATUS AND CORRESPONDING METHODS FOR FORM FACTOR AND ORIENTATION MODALITY CONTROL

(71) Applicant: MOTOROLA MOBILITY LLC, Chicago, IL (US)

(72) Inventor: Elliot M. Stewart, Buffalo Grove, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 14/814,592

(22) Filed: Jul. 31, 2015

(65) Prior Publication Data

US 2017/0034320 A1 Feb. 2, 2017

(51) Int. Cl.
*H04M 1/02* (2006.01)
*G06F 1/16* (2006.01)
*G09G 5/14* (2006.01)
*H04M 1/725* (2006.01)

(52) U.S. Cl.
CPC ........ *H04M 1/0268* (2013.01); *G06F 1/1601* (2013.01); *G06F 1/1626* (2013.01); *G09G 5/14* (2013.01); *G09G 2340/0464* (2013.01); *G09G 2354/00* (2013.01); *G09G 2380/02* (2013.01); *H04M 1/72569* (2013.01)

(58) Field of Classification Search
CPC ................ G06F 1/1601; G06F 1/1626; G09G 2340/0464; G09G 2354/00; G09G 2380/02; G09G 5/14; H04M 1/0268; H04M 1/72569

USPC .......................................... 345/170–176, 165
See application file for complete search history.

(56) References Cited

U.S. PATENT DOCUMENTS

| | | | |
|---|---|---|---|
| 8,928,580 B2 | 1/2015 | Hwang et al. | |
| 8,928,594 B2 | 1/2015 | Chang et al. | |
| 8,929,085 B2 | 1/2015 | Franklin et al. | |
| 8,976,141 B2 | 3/2015 | Myers et al. | |
| 2010/0117975 A1* | 5/2010 | Cho ....................... | G06F 1/1626 345/173 |

(Continued)

OTHER PUBLICATIONS

Somi Das, A keyboard that rises up from flat touch screens, http://www.cnet.com/news/a-keyboard-that-rises-up from-flat-touch-screens/, Feb. 13, 2013, all pages.

(Continued)

*Primary Examiner* — Tony Davis
(74) *Attorney, Agent, or Firm* — Philip H. Burrus, IV

(57) ABSTRACT

An electronic device (100) includes a housing (101), one or more processors (116), and a display (102). The display, housing, and other components are flexible, stretchable, squeezable, or otherwise deformable in one or more embodiments. One or more flex sensors (156) are operable with the one or more processors, as is a gravity sensor such as an accelerometer (152). The one or more processors can detect (303) a bending operation (301) with the one or more flex sensors that deforms one or more of the housing or the display into a deformed geometry (402). The one or more sensors can then determine a gravity direction (503) with the gravity sensor, after the bending operation and operate (602) the electronic device in a predefined mode of operation (705) as a function of both the deformed geometry and the gravity direction.

19 Claims, 8 Drawing Sheets

(56) References Cited

U.S. PATENT DOCUMENTS

| | | | |
|---|---|---|---|
| 2012/0166997 A1* | 6/2012 | Cho | G06F 21/6218 |
| | | | 715/778 |
| 2013/0050270 A1* | 2/2013 | Joo | G09G 3/20 |
| | | | 345/661 |
| 2013/0265257 A1* | 10/2013 | Jung | G06F 3/0412 |
| | | | 345/173 |
| 2013/0265262 A1* | 10/2013 | Jung | G06F 3/041 |
| | | | 345/173 |
| 2014/0197936 A1* | 7/2014 | Biggs | G08B 6/00 |
| | | | 340/407.1 |
| 2015/0378557 A1* | 12/2015 | Jeong | G06F 3/0488 |
| | | | 715/835 |
| 2016/0321969 A1* | 11/2016 | Kambhatla | G09G 3/003 |

OTHER PUBLICATIONS

Jordan Kahn, "More Apple patents detail completely flexible devices that change as they bend", 9TO5Mac, http://9to5mac.com/2013/04/10/more-apple-patents-detail-completely-flexible-devices-that-change-as-they-bend/ Apr. 10, 2013, all pages.

\* cited by examiner

APPARATUS AND CORRESPONDING METHODS FOR FORM FACTOR AND ORIENTATION MODALITY CONTROL

BACKGROUND

Technical Field

This disclosure relates generally to electronic devices and corresponding methods, and more particularly to physically deformable electronic devices.

Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

These smaller, yet more powerful, devices are being used for many different applications in many different environments. It would be advantageous to have increased methods to control operating modes of an electronic device to adapt performance to a given environment or application.

Figure 1:
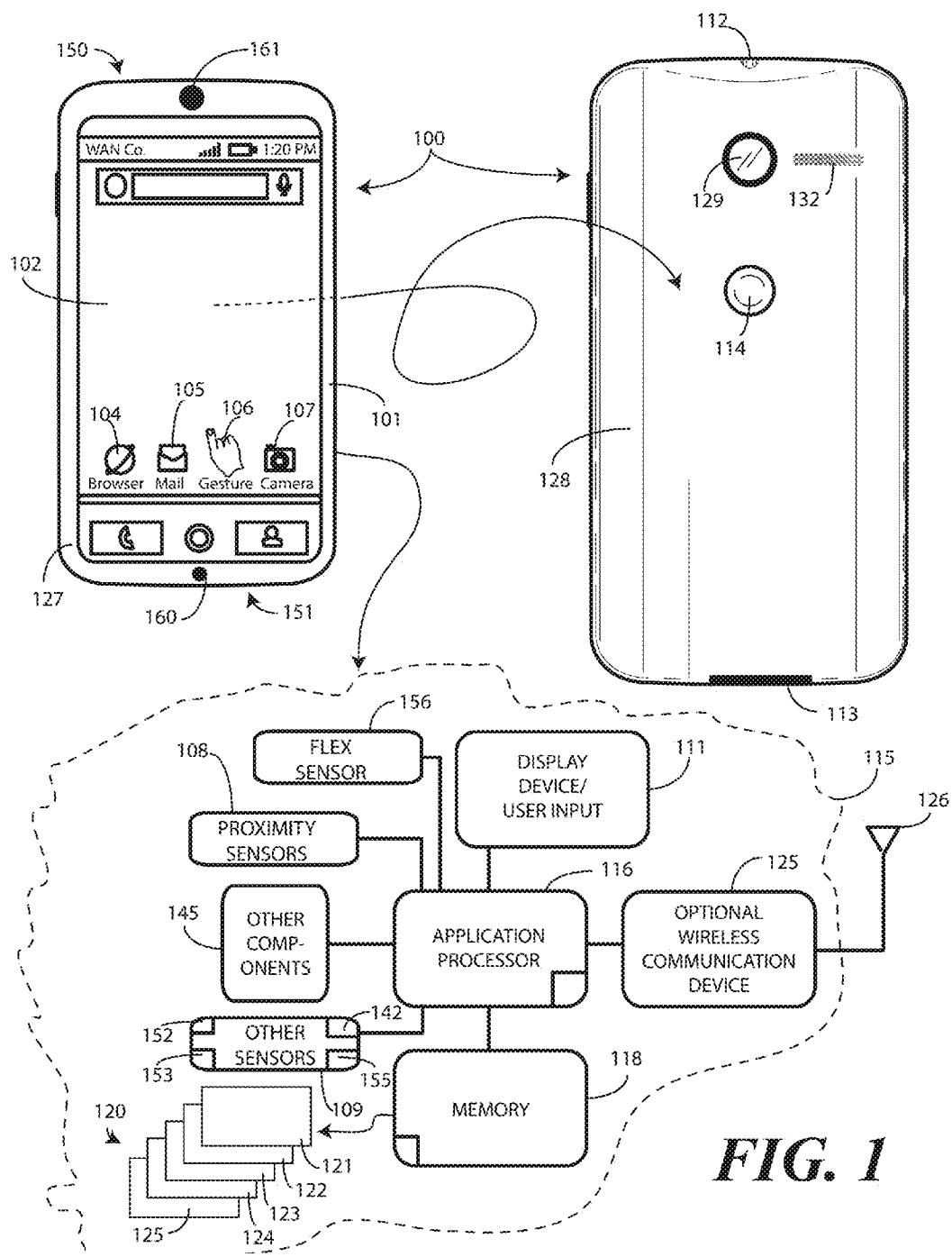
FIG. 1 illustrates a schematic block diagram of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting a bending operation occurring to deform the electronic device, a geometry of the electronic device after the bending operation, and a gravity direction. Once this occurs, one or more processors can operate the electronic device in a predefined mode of operation as a function of the geometry after the bending operation and the gravity direction. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of detecting geometry and gravity direction, and operationally setting an active modality of the electronic device in response, as described herein. The non-processor circuits may include, but are not limited to, microphones, loudspeakers, acoustic amplifiers, digital to analog converters, signal drivers, clock circuits, power source circuits, and user input devices. As such, these functions may be interpreted as steps of a method to perform the detection of geometry and device orientation relative to the earth to set an operating mode. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes a physically deformable housing and display. In one embodiment, the housing is a flexible hosing and the display is a bendable display. Internal and external components can be flexible as well. For instance, flexible batteries and flexible circuit boards can support various components within the electronic device. Touch sensors and substrates can be flexible as well. Remaining or other components disposed within the electronic device, such as one or more processors, other sensors, and other devices, are arranged such that a user can flex, bend, and/or fold the electronic device by executing a bending operation that physically deforms one or more of the housing or display into a deformed geometry.

In one embodiment, one or more flex sensors, operable with the one or more processors, detect the bending operation. The one or more flex sensors can also determine a configuration of the deformed geometry after the bending operation. For example, the deformed geometry can include a convex curvature, a concave curvature, a fold, a multi-fold geometry, or other geometries.

In one embodiment, a gravity sensor, which may be an accelerometer, gyroscope, altimeter, barometer, or other device, is also operable with the one or more processors. The gravity sensor, in one embodiment, can determine a gravity direction acting on the housing of the electronic device. The one or more processors can then operate the electronic device in a predefined mode of operation as a function of both the deformed geometry and the gravity direction. Accordingly, a user can control the operating mode by bending the electronic device and orienting the electronic device relative to the earth's surface. While a convex curved geometry with the left side oriented upward may invoke a media player mode of operation with a movie or photograph slide show presented on the display, the same convex curved geometry with the right side oriented upward may invoke a docked mode of operation with an alarm clock presented on the display.

In one or more embodiments, the mode of operation delivers a unique and transformative user experience as a function of the posture or geometry and the orientation of the electronic device. Illustrating by example, by bending the electronic device with one bending operation and orienting the device in a first orientation, the user can create a smartphone "docked" experience without the need for the docking hardware.

In one embodiment, an electronic device, such as a smartphone, gaming device, multimedia player, or other device, has a default geometry that includes a housing defined by straight axes in three dimensions. At the same time, the electronic device includes a deformable, e.g., flexible and/or bendable display and housing technology that allows for conversion by a bending operation from a flat configuration to a bent or curved configuration. Using terms of the art, a user can apply a bending operation to transform the electronic device from a "candy bar" to, for example, a "half-oval" physical geometry by actively bending the device. In one embodiment, the "half-oval" geometry, when the device is oriented in a landscape mode allows the electronic device to "stand" successfully by itself stand when placed on a flat surface such as a table.

Once in this position, the gravity sensor can detect whether the right side or the left side of the electronic device is oriented upward by detecting a direction of gravity. When this occurs, one or more processors of the device can launch a predefined mode of operation. In one embodiment, the predefined mode of operation is a docked mode of operation. As used herein, the "docked" mode refers to a mode that simulates what occurs when the electronic device has been coupled to, or "docked" to a physical docking station. When docked, many electronic devices enter alternate operating environments and offer feature sets only available in the docked mode.

Illustrating by example, in one embodiment, an electronic device is configured for operation in a dual-operating system hybrid environment. A first operating system environment is active during normal operation, e.g., when the electronic device is not docked. However, in certain use cases when the electronic device is in the docked mode, the device can enter a second operating system environment having enhanced data usage capabilities. In one embodiment, this docked mode of operation is referred to as a "dual-OS" or "multi-OS" environment, in that the device has access to two simultaneous operating system environments. The first operating system environment is a standard mobile operating environment, where the device is configured to interact with a wide area network using standard wide area network data rates and usage modes. The second operating system environment gives rise to an enhanced data usage rate, in that the second operating system environment includes an enhanced, full, multi-window desktop environment where the device can access a desktop class web browser and web applications, which are similar to those normally found only on a personal computer. In this second mode of operation, the device also runs the first operating system environment, and accordingly presents one or more dedicated windows that display the content and results of operational steps in the first environment. These windows can be referred to as the "Mobile View" of the WebTop. A user can start, stop, or interact with the first environment applications inside a Mobile View window. The dual-operating system hybrid environment enables the user to access a full desktop computer web browsing experience with a mobile device, e.g., viewing the full desktop versions of Internet websites that include Adobe Flash 10™-based websites through the portable electronic device's built-in web browser and web application framework. This dual operating system environment is but one example of an enhanced feature set occurring in a docked mode. Others will be readily obvious to those of ordinary skill in the art having the benefit of this disclosure.

Traditional electronic devices only entered the docked mode when an electronic device was physically coupled to a peripheral hardware component having a dual-operating system hybrid environment license. By contrast, with embodiments of the present disclosure a user may place the device into a docked mode of operation by simply bending and orienting the electronic device. Advantageously, an electronic device with a bendable display and flexible housing can be converted to a standalone dock without the need of any peripheral components. By simply detecting a particular geometry, e.g., a half-oval posture, combined with positional sensor data, the electronic device can function as if physically coupled to a physical docking station peripheral.

When in the docked mode, the electronic device may function in many different modes of operation. For example, in one mode the electronic device can execute applications for presentation on an external display. The electronic device may convert to a high definition movie player for a companion wide screen display for instance. Alternatively, the electronic device may execute advanced applications so as to resemble a traditional laptop computer. In still other embodiments, the electronic device can automatically launch a docked user interface. Experiences such as multimedia viewing of videos, rotating pictures, calendar/weather station, alarm clock, and so forth can be presented on a display in this mode. Other features will be obvious to those of ordinary skill in the art having the benefit of this disclosure. Advantageously, embodiments of the disclosure offer a literally "flexible" display and housing technology that has a dedicated purpose for the end user rather than merely being "technology for technology's sake."

The deformability of embodiments of the disclosure not only offer unique ways of controlling the operating modes of the device, but also can simply make the device easier to use. For example, by being able to stand an otherwise thin electronic device on its side, the display can be easily viewable despite the fact that the electronic device is out of the user's hand. Bending the device into folded, half-oval, and multifold shapes allows the device to transform into a "self-standing" device. This enables modes such as an alarm clock mode of operation to be more viewable and more practical.

In one or more embodiments, different deformed geometries can launch different modes of operation. Illustrating by example, a single fold, a multi-fold, or a curved bend geometry can each be associated with launching or hosting different display/user experiences. In one or more embodiments, a number of bends can be used to partition the display. If the electronic device is bent with a single fold, when placed on a table the electronic device can resemble a card folded into a "tent fold." Where this occurs, one or more processors of the electronic device can partition the display into two parts, with each part being on a different side of the tent. Different user interfaces of operating modes can be presented in the two portions of the display. More permutations are completely possible and will be described in the paragraphs below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display.

In one embodiment, the display 102 is configured as a organic light emitting diode (OLED) display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 102 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 102 may be formed from multiple layers of flexible material such as flexible sheets of polymer or other materials.

The explanatory electronic device 100 of FIG. 1 also includes a housing 101. In one or more embodiments, the housing 101 is flexible. In one embodiment, the housing 101 may be manufactured from a malleable, bendable, or physically deformable material such as a flexible thermoplastic, flexible composite material, flexible fiber material, flexible metal, organic or inorganic textile or polymer material, or other materials. In other embodiments, the housing 101 could also be a combination of rigid segments connected by hinges or flexible materials. Still other constructs will be obvious to those of ordinary skill in the art having the benefit of this disclosure.

The housing 101 can be formed from a single flexible housing member or from multiple flexible housing members. In this illustrative embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128. These features are shown being disposed on the rear major face of the electronic device 100 in this embodiment, but could be located elsewhere, such as on the front major face in other embodiments.

In one embodiment, the electronic device 100 includes one or more connectors 112,113, which can include an analog connector, a digital connector, or combinations thereof. In this illustrative embodiment, connector 112 is an analog connector disposed on a first end 150, i.e., the top end, of the electronic device 100, while connector 113 is a digital connector disposed on a second end 151 opposite the first end 150, which is the bottom end in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, logic steps, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a gesture application 106 configured to detect gesture actions by a user near or along the electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 108 can be operable with the one or more processors 116. In one embodiment, the one or more proximity sensors 108 include one or more proximity sensor components 140. The proximity sensors 108 can also include one or more proximity detector components 141. In one embodiment, the proximity sensor components 140 comprise only signal receivers. By contrast, the proximity detector components 141 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 140 comprises an infrared signal receiver so as to be able to detect infrared emissions from a person. Accordingly, the proximity sensor component 140 requires no transmitter since objects disposed external to the housing deliver emissions that are received by the infrared receiver. As no transmitter is required, each proximity sensor component 140 can operate at a very low power level. Evaluations conducted show that a group of infrared signal receivers can operate with a total current drain of just a few microamps (~10 microamps per sensor). By contrast, a proximity detector component 141, which includes a signal transmitter, may draw hundreds of microamps to a few milliamps.

In one embodiment, one or more proximity detector components 141 can each include a signal receiver and a corresponding signal transmitter. The signal transmitter can transmit a beam of infrared light that reflects from a nearby object and is received by a corresponding signal receiver. The proximity detector components 141 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 100.

Figure 11:
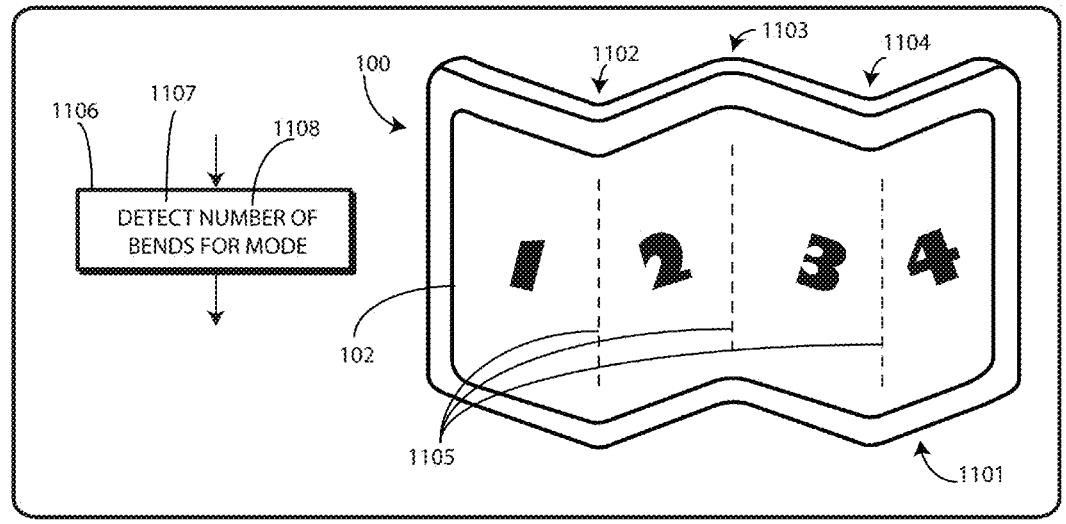
FIG. 11 illustrates another explanatory configuration of an electronic device and one or more method steps in accordance with one or more embodiments of the disclosure.

In one embodiment, the electronic device 100 includes one or more flex sensors 156, operable with the one or more processors 116, to detect a bending operation deforming one or more of the housing 101 or the display 102 into a deformed geometry, such as that shown in FIG. 11. In one embodiment, the flex sensors 156 each comprise passive resistive devices manufactured from a material with an impedance that changes when the material is bent, deformed, or flexed. By detecting changes in the impedance as a function of resistance, the one or more processors 116 can use the one or more flex sensors 156 to detect bending or flexing. In one or more embodiments, each flex sensor 156 comprises a bi-directional flex sensor that can detect flexing or bending in two directions. In one embodiment, the one or more flex sensors 156 have an impedance that increases in an amount that is proportional with the amount it is deformed or bent.

In one embodiment, each flex sensor 156 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 156 bends, the impedance of the resistive layer changes, thereby altering the flow of current for a given voltage. The one or more processors 116 can detect this change to determine an amount of bending. Taps can be added along each flex sensor 156 to determine other information, including the number of folds, the degree of each fold, the direction of the folds, and so forth. The flex sensor 156 can further be driven by time-varying signals to increase the amount of information obtained from the flex sensor 156 as well.

While a multi-layered device as a flex sensor 156 is one configuration suitable for detecting at least a bending operation occurring to deform the electronic device 100 and a geometry of the electronic device 100 after the bending operation, others can be used as well. For example, in another embodiment the proximity sensors 108 can be used to detect how far the first end 150 of the electronic device 100 is from the second end 151 of the electronic device 100. Still other types of flex sensors 156 will be obvious to those of ordinary skill in the art having the benefit of this disclosure.

In one embodiment, the one or more processors 116 may generate commands or execute control operations based on information received from the various sensors, including the one or more flex sensors 156, the one or more proximity sensors 108, or the other sensors 109. The one or more processors 116 may also generate commands or execute control operations based upon information received from a combination of the one or more flex sensors 156, the one or more proximity sensors 108, or the other sensors 109. Alternatively, the one or more processors 116 can generate commands or execute control operations based upon information received from the one or more flex sensors 156 alone. Moreover, the one or more processors 116 may process the received information alone or in combination with other data, such as the information stored in the memory 118.

The one or more other sensors 109 may include a microphone 160, an earpiece speaker 161, a second loudspeaker (disposed beneath speaker port 132), and a user interface component 114 such as a button. The one or more other sensors 109 may also include key selection sensors, a touch pad sensor, a touch screen sensor, a capacitive touch sensor, and one or more switches. Touch sensors 155 may used to indicate whether any of the user actuation targets present on the display 102 are being actuated. Alternatively, touch sensors 155 disposed in the housing 101 can be used to determine whether the electronic device 100 is being touched at side edges or major faces of the electronic device 100 are being performed by a user. The touch sensors 155 can include surface and/or housing capacitive sensors in one embodiment. The other sensors 109 can also include audio sensors and video sensors (such as a camera).

The other sensors 109 can also include motion detectors 142, such as one or more accelerometers 152 or gyroscopes 153. For example, an accelerometer 152 may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope 153 can be used in a similar fashion.

Regardless of the type of motion detectors 142 that are used, in one embodiment the motion detectors 142 are also operable to detect movement, and direction of movement, of the electronic device 100 by a user. In one or more embodiments, the other sensors 109 and the motion detectors 142 can each be used to detect motion corresponding to a user's body or to human motion. This information can be used to determine that the electronic device 100 is proximately located with a user's body.

Illustrating by example, in one embodiment when the electronic device 100 is being carried by a user or is disposed within a pocket of clothing that a user is wearing, the motion detectors 142 can be used to detect predefined motions corresponding to human motion. These predefined motions can be small, and can include vibration, shaking, breathing, micromotions, and so forth. For instance, if the user is walking, the motion detectors 142 can detect this movement. The one or more processors 116 can then extract parametric data from electronic signals delivered by these motion detectors 142 in response to the user walking. By comparing the parametric data to a reference file stored in memory 118, the one or more processors 116 can identify the walking motion as corresponding to the motion of the user's body. The one or more processors 116 can use this information to distinguish the electronic device 100 being in a user's pocket compared to, for example, being placed along a flat surface such as a nightstand or dresser top.

Similarly, if the user is simply sitting in a chair, the motion detectors 142 can be used to detect body motions—even tiny ones—such as that of the user breathing. By comparing the parametric data extracted from this motion to a reference file stored in memory 118, the one or more processors 116 can identify the fact that the movement that the electronic device 100 is experiencing is due to the fact that the electronic device 100 is proximately located with a user's torso, limbs, head, or appendages, or otherwise generally disposed along the user body instead of, for example, being placed on a table. Other user motion that can be readily detected by parametric data includes motion associated with driving, riding a bike, or simply shifting in their seat. In one or more embodiments, the one or more processors 116 can conclude from these motions that the electronic device 100 is disposed near or on a person's body. The motion detectors 142 can be used to detect other movement of the electronic device 100 as well. For example, in some embodiments a user can deliver gesture input by moving a hand or arm in predefined motions in close proximity to the electronic device 100.

Many of the sensors in the electronic device 100 can be used to detect movement, gestures, or other user input. For example, the one or more proximity sensors 108 can detect the gesture of a user waving a hand above the display 102. In another embodiment, the user can deliver gesture input by touching the display 102. In yet another embodiment, the accelerometer 152 can detect gesture input from a user lifting, shaking, or otherwise deliberately moving the electronic device 100. In yet other embodiments, the user can deliver gesture input by rotating or changing the orientation of the electronic device 100, which can be detected by multiple accelerometers 152 or a gyroscope 153. It should be clear to those of ordinary skill in the art having the benefit of this disclosure that additional sensors can be included with the other sensors 109 shown in FIG. 1.

Other components 145 operable with the one or more processors 116 can include output components such as video outputs, audio outputs, and/or mechanical outputs. Examples of output components include audio outputs such as speaker port 132, earpiece speaker 161, or other alarms and/or buzzers and/or a mechanical output component such as vibrating or motion-based mechanisms. Still other components will be obvious to those of ordinary skill in the art having the benefit of this disclosure.

In one or more embodiments, the one or more processors 116 are operable to detect motion of the electronic device 100. In one embodiment, the accelerometer 152 serves as a motion detector operable with the one or more processors 116. A gyroscope 153 then serves as another motion detector operable with the one or more processors 116. Where a gyroscope 153 is not included with the electronic device 100, multiple accelerometers can substitute for the gyroscope 153 to determine rotation of the electronic device 100 about the axis. In such an embodiment, the accelerometer 152 would serve as the motion detector while the accelerometer 152 and another accelerometer substitute for the gyroscope 153. This results in the other motion detector having an accelerometer 152 in common with the motion detector.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
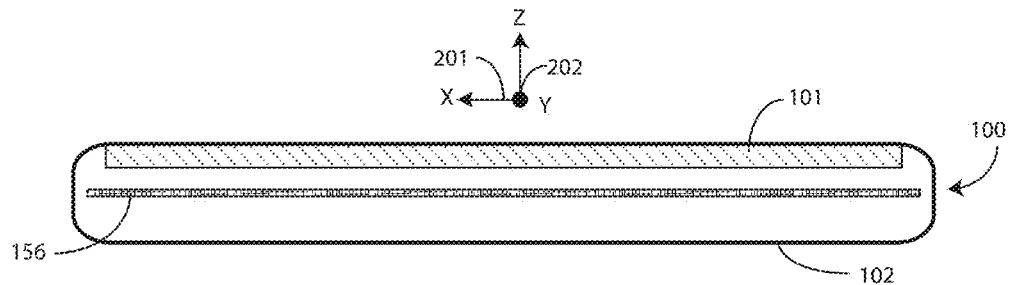
FIG. 2 illustrates a sectional view of one explanatory electronic device in accordance with one or more embodiments of the disclosure.

Now that the various hardware components have been described, attention will be turned to methods and use cases in accordance with one or more embodiments of the disclosure. Beginning with FIG. 2, illustrated therein is a sectional view of the electronic device 100. Shown with the electronic device 100 are the display 102 and the housing 101, each of which is flexible in this embodiment. Also shown is the flex sensor 156, which spans at least two axes 201,202 of the electronic device 100.

Figure 3:
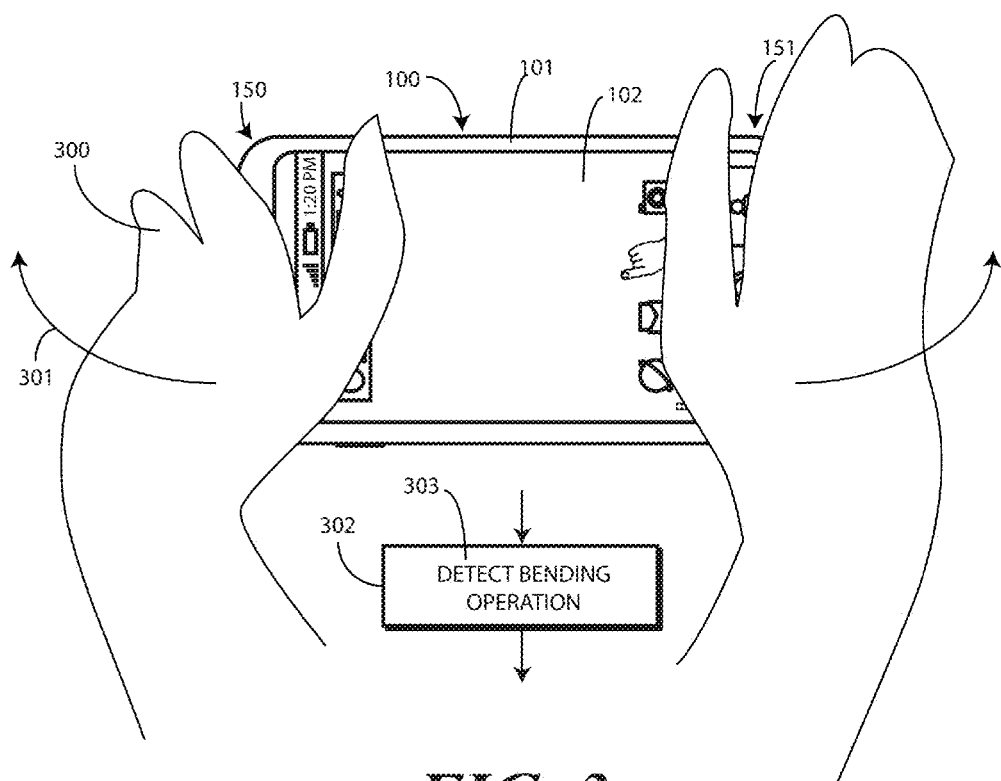
FIG. 3 illustrates a user manipulating one explanatory electronic device in accordance with one or more embodiments of the disclosure to execute a bending operation occurring to deform the electronic device.

As shown in FIG. 3, a user 300 is executing a bending operation 301 upon the electronic device 100. FIG. 3 also illustrates at least one step 302 of a method for controlling the electronic device 100 as well.

In this illustration, the user 300 is applying force (into the page) at the first end 150 and the second end 151 of the electronic device 100 to bend both the housing 101 and the display 102. Internal components disposed along flexible substrates are allowed to bend as well. The result of the bending operation 301 is shown in FIG. 4.

In one embodiment, the one or more processors (116) of the electronic device 100 detect 303 this bending operation 301 is occurring by detecting a change in an impedance of the one or more flex sensors (156). The one or more processors (116) can detect this bending operation 301 in other ways as well. For example, the touch sensors can detect touch and pressure from the user 300. Alternatively, the proximity sensors can detect the first end 150 and the second end 151 of the electronic device 100 getting closer together. Force sensors can detect an amount of force that the user 300 is applying to the housing 101 as well. Other techniques for detecting that the bending operation 301 is occurring will be obvious to those of ordinary skill in the art having the benefit of this disclosure.

Figure 4:
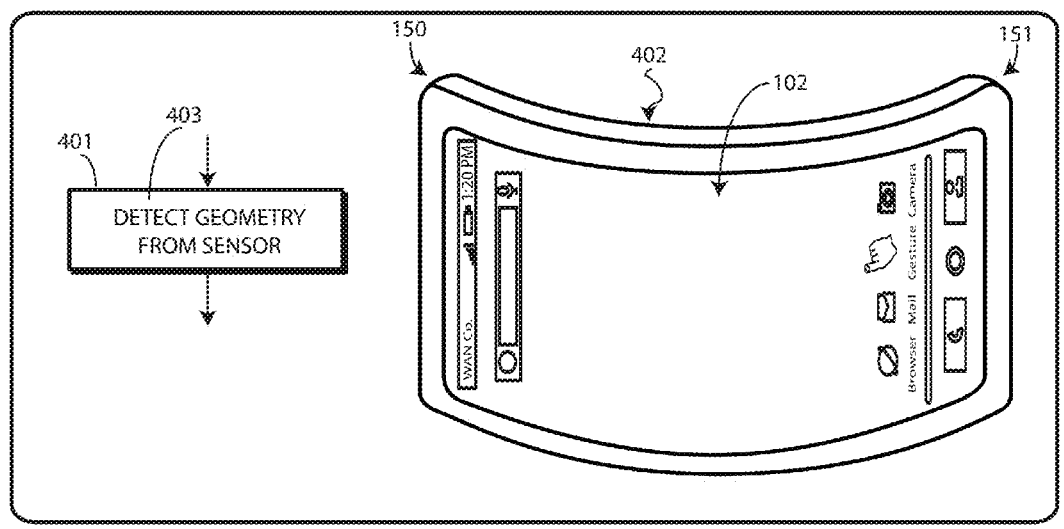
FIG. 4 illustrates one or more method steps in accordance with one or more embodiments of the disclosure.

Turning to FIG. 4, illustrated therein is another step 401 of a method for controlling the electronic device 100. As shown, the bending operation (301) of FIG. 3 results in the electronic device 100 being transformed into a deformed geometry 402. Here, the deformed geometry 402 is a convex geometry with the display 102 protruding outward. Had the bending operation (301) been in the opposite direction, the deformed geometry 402 could have been a concave geometry with the display 102 receding inward. As will be shown in the description of FIGS. 10 and 11 below, in other embodiments the deformed geometry 402 can be a folded geometry, multi-folded geometry, or other geometry. Still other geometries will be obvious to those of ordinary skill in the art having the benefit of this disclosure.

As shown at step 401, in one embodiment the one or more processors (116) of the electronic device 100 detect 403 the geometry of the electronic device 100 after the bending operation (301), which in this case is the deformed geometry 402. As with detecting the bending operation (301), the deformed geometry 402 can be detected in a variety of ways. In one embodiment, the one or more processors (116) of the electronic device 100 detect 303 the deformed geometry 402 by detecting a characteristic impedance of the one or more flex sensors (156) and comparing it to a predefined impedance profile stored in the memory (118) of the electronic device 100 to determine what the exact deformed geometry 402 might be. Alternatively, the one or more proximity sensors (108) can detect a distance between the first end 150 and the second end 151 of the electronic device 100 to determine the amount of bend. Other techniques for detecting the deformed geometry 402 will be obvious to those of ordinary skill in the art having the benefit of this disclosure.

Figure 5:
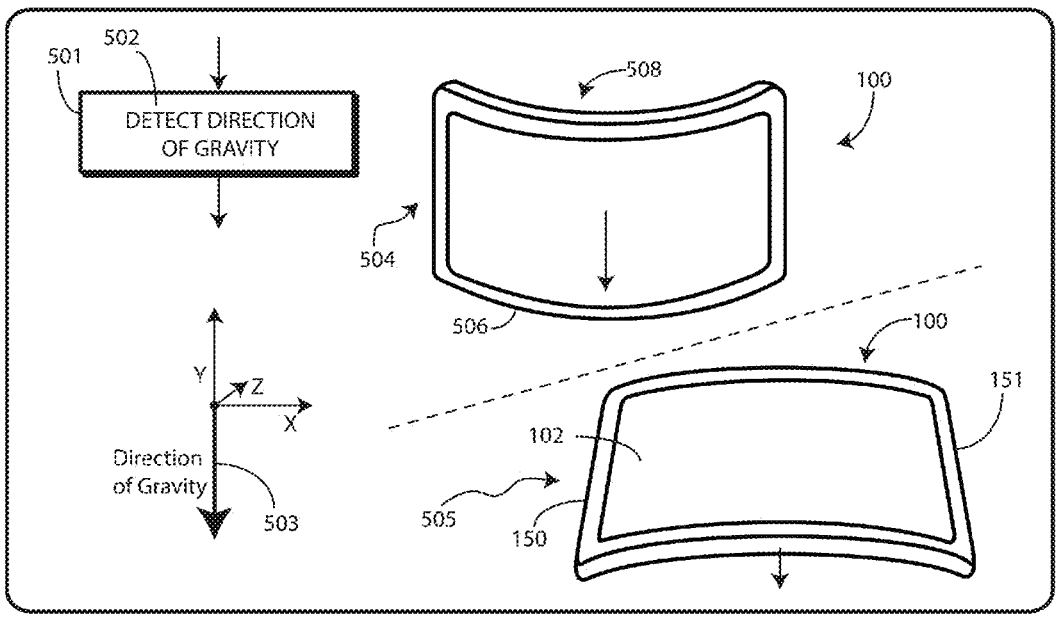
FIG. 5 illustrates one or more method steps in accordance with one or more embodiments of the disclosure.

Turning now to FIG. 5, in one embodiment another step 501 of the method of controlling the electronic device 100 includes detecting 502 a gravity direction 503. As shown the electronic device 100 can be placed in one of many different orientations once bent into the deformable geometry (402). Two such illustrative orientations are shown in FIG. 5: a first orientation 504 in which a right side 506 is placed along a flat surface and a second orientation 505 in which the first end 150 and the second end 151 of the electronic device 100 are placed downward with the display 102 facing upward. These two orientations are merely examples, as numerous others exist. For example, the electronic device 100 of the first orientation 504 could be turned over with the right side 508 facing downward to define a third orientation. Regardless of orientation, the gravity direction 503 operates on the electronic device 100 differently. Thus, a user has a second degree of control over the operating mode of the electronic device 100 by altering this orientation.

As shown at step 501, in one embodiment the one or more processors (116) of the electronic device 100 are further operable to determine a gravity direction 502 relative to the electronic device 100. This can be done with the accelerometer (152) in one embodiment.

In one embodiment, a moving average of acceleration values, as measured by the accelerometer (152), and denoted α.sub.zero, is maintained in memory (118) by the one or more processors (116). For example, a moving average of acceleration values can be maintained in one embodiment. At any one time, an instantaneous acceleration value can be measured by taking the square root of the sum of the instantaneous acceleration along the X-axis squared, the instantaneous acceleration along the Y-axis squared, and the instantaneous acceleration along the Z-axis squared. This value can be calculated at periodic intervals, such as five or ten times a second, with each value being added to the moving average number of values on a first-in-first-out basis.

At any one time, meaningful acceleration can be determined by subtracting the moving average acceleration value from an instantaneous acceleration value. Where this value is below a predetermined acceleration threshold, such as 0.5 meters per second squared, the one or more processors (116) can conclude that the electronic device 100 is not moving. Where this meaningful acceleration value is zero for a set number of predetermined cycles, concluded values for acceleration due to gravity of the electronic device 100 can be determined. The difference between the running average of acceleration and the acceleration due to gravity can then be calculated to determine the effect of gravity. This provides a directionality that allows the one or more processors (116) to determine in which direction gravity pulls on the electronic device 100.

Once the deformed geometry (402) and the gravity direction 503 are determined, in one embodiment the one or more processors (116) of the electronic device can operate the electronic device 100 in a predefined mode of operation as a function of both the deformed geometry and the gravity direction. This is shown in FIG. 6.

Figure 6:
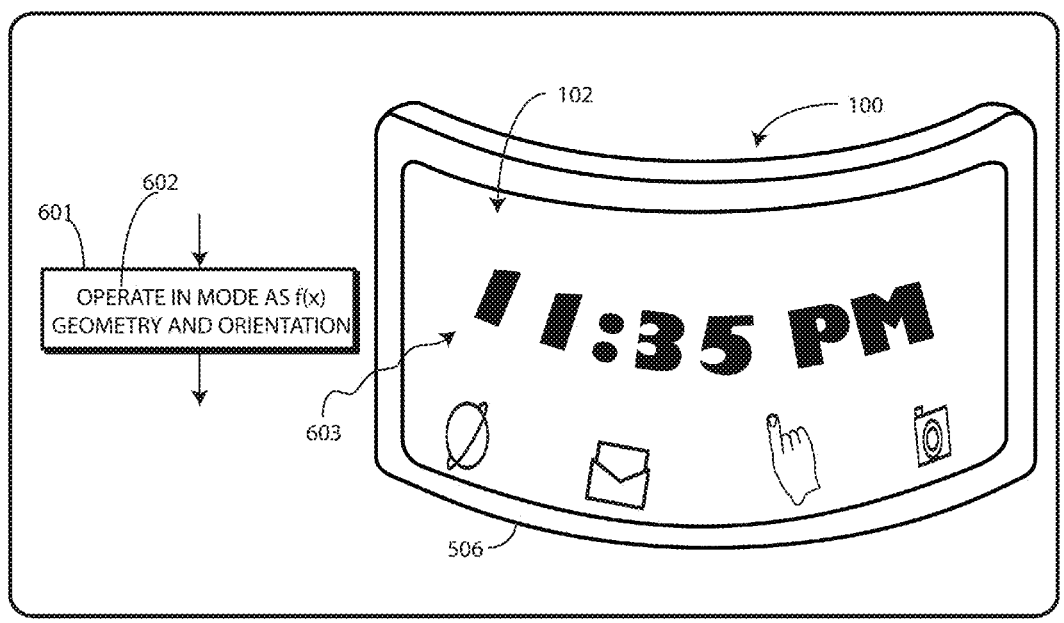
FIG. 6 illustrates one or more method steps in accordance with one or more embodiments of the disclosure.

Turning now to FIG. 6, the electronic device 100 is shown in the convex geometry configuration, with the left side 506 placed down on a flat surface. Accordingly, the deformed geometry (402) is convex and the gravity direction (503) pulls downward through the left side 506 of the electronic device 100. As shown at step 601, the one or more processors (116) of the electronic device 100 can operate the electronic device 100 in a predefined mode of operation 603 as a function of the deformed geometry (402) occurring after the bending operation (301) and the gravity direction (503). In this illustrative embodiment, the predefined mode of operation 603 is that of an alarm clock. A clock-like presentation is provided on the display 102. However, the predefined mode of operation 603 could have been any number of other modes, as will be discussed in more detail with reference to subsequent figures below.

Figure 7:
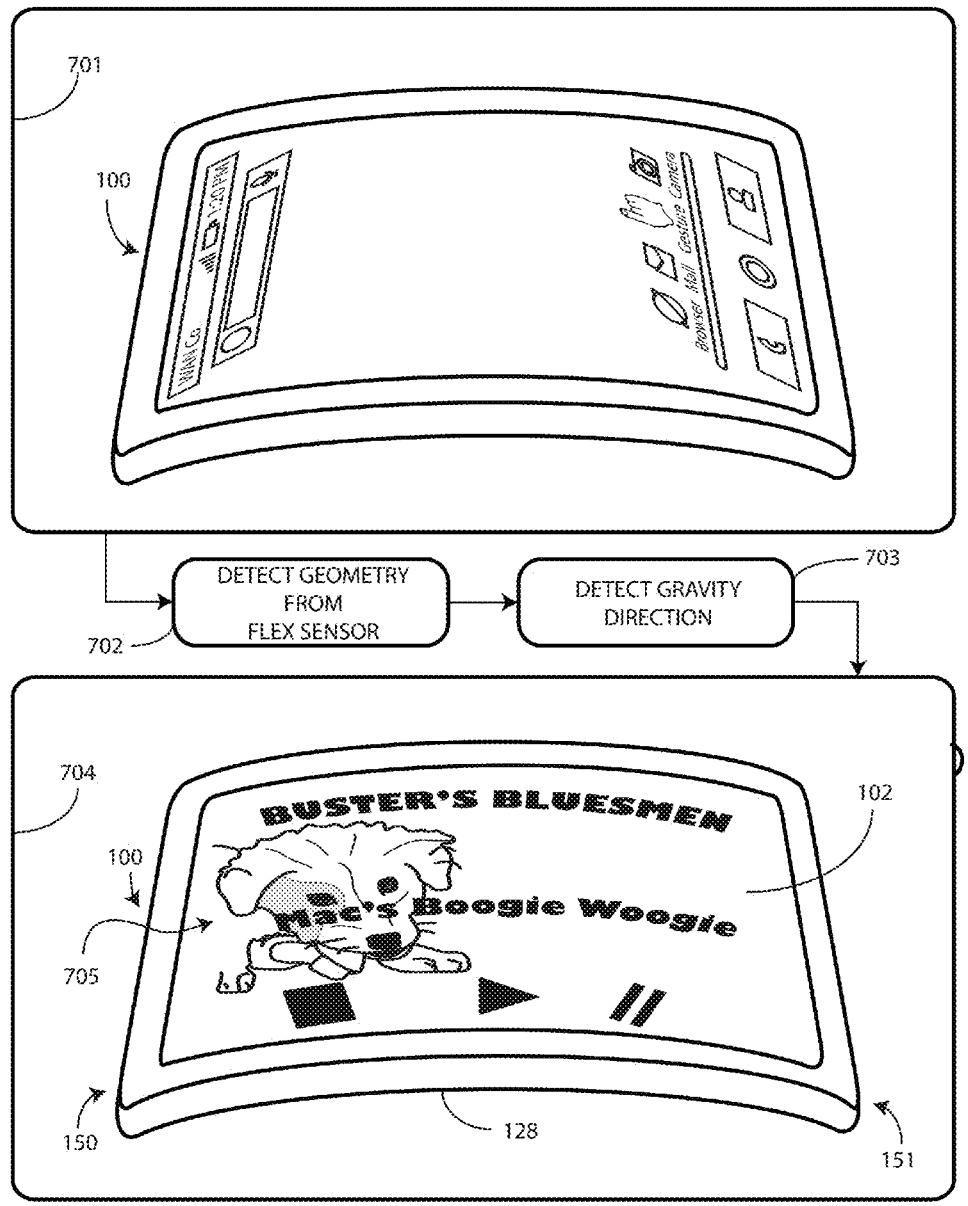
FIG. 7 illustrates one explanatory method of controlling an electronic device in accordance with one or more embodiments of the disclosure.

The predefined mode of operation 603 occurring in FIG. 6 is different from that occurring in FIG. 7 despite the fact that the deformed geometry (402) is the same. Turning now to FIG. 7, at step 701 a user (300) has performed a bending operation (301) to bend the electronic device 100 into a convex deformed geometry. At step 702, the one or more processors (116) of the electronic device 100 detect (403) the geometry of the electronic device 100. In one embodiment, this occurs after the bending operation (301) is complete.

At step 703, in one embodiment the one or more processors (116) of the electronic device 100 are further operable to determine (801) the gravity direction (503) relative to the electronic device 100. This can be done with the accelerometer (152) in one embodiment. In other embodiments, the gravity direction (503) can be determined with a gyroscope. In still other embodiments, the gravity direction (503) can be determined with a barometer by measuring in which directions pressure changes and in which directions pressure does not change. These pressure measurements can be used to construct an axis system that includes the gravity direction (503). An altimeter can be used in similar fashion. Other methods for detecting the gravity direction (503) will be obvious to those of ordinary skill in the art having the benefit of this disclosure.

At step 704, the electronic device 100 is shown in the convex geometry configuration, with the first end 150 and the second end 151 of the electronic device 100 placed facing downward toward a flat surface. Accordingly, the deformed geometry (402) is convex and the gravity direction (503) pulls downward through the rear housing 128 of the electronic device 100. The one or more processors (116) of the electronic device 100 can then operate the electronic device 100 in another predefined mode of operation 705 as a function of the deformed geometry (402) occurring after the bending operation (301) and the gravity direction (503), which is different from the predefined mode of operation (603) occurring in FIG. 6. The predefined modes are different—despite the common deformed geometry (402)—due to the different orientation of the electronic device. In this illustrative embodiment, the predefined mode of operation 705 is that of a multimedia player. As shown in FIG. 7, the title track, "Mac's Boogie Woogie," by the artist Buster and his Bluesmen, is being played. Album cover art is also presented on the display 102.

Figure 8:
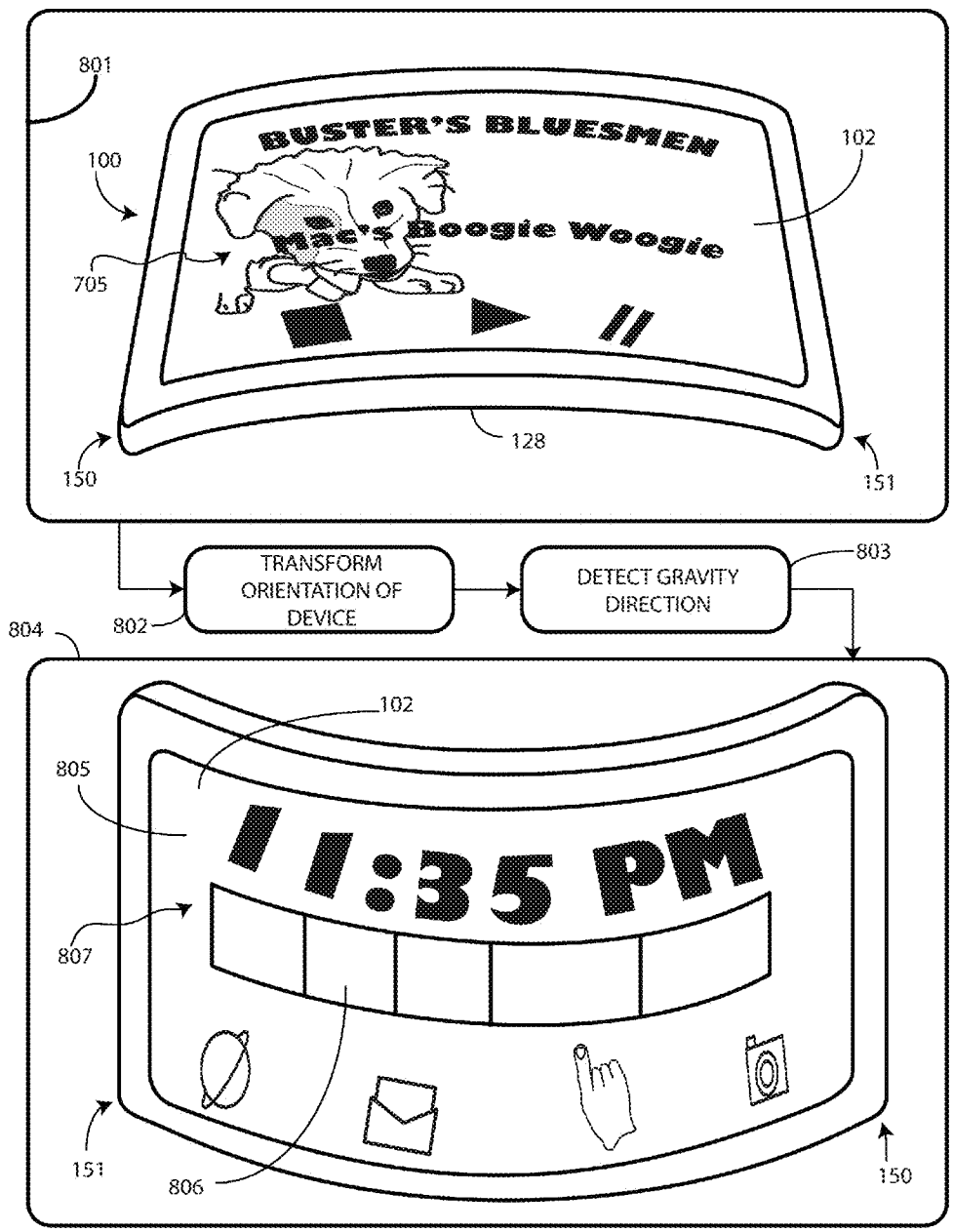
FIG. 8 illustrates another explanatory method of controlling an electronic device in accordance with one or more embodiments of the disclosure.

Turning now to FIG. 8, in one or more embodiments the one or more processors (116) can detect, with the one or more sensors, a change in the gravity direction (503), and can change the predefined mode of operation to another predefined mode of operation in response to the change in the gravity direction (503). The change in gravity direction (503) can be detected in one of a variety of ways. For example, it could be determined by subtracting the moving average acceleration value from an instantaneous acceleration value as previously described. Alternatively, the one or more processors (116) can determine motion of the electronic device 100 from the motion detector (142) and can extract parametric data to confirm that this motion to determine a change in device orientation. Still other methods will be obvious to those of ordinary skill in the art having the benefit of this disclosure.

At step 801, the electronic device 100 is shown in the convex geometry configuration, with the first end 150 and the second end 151 of the electronic device 100 placed facing downward toward a flat surface as was the case in step (704) of FIG. 7. Accordingly, the deformed geometry (402) is convex and the gravity direction (503) pulls downward through the rear housing 128 of the electronic device 100. The one or more processors (116) of the electronic device 100 operate in the predefined mode of operation 705 is that of the multimedia player. As before, the title track, "Mac's Boogie Woogie," by the artist Buster and his Bluesmen, is being played. Album cover art is also presented on the display 102.

At step 802, a user changes the orientation of the electronic device 100, with the result shown at step 804. At step 803, the one or more processors (116) of the electronic device 100 then determine (801) the gravity direction (503) relative to the electronic device 100.

As shown at step 804, the electronic device 100 is still in the convex geometry configuration. However, in contrast to the first orientation (504) of FIG. 5, where the left side (506) was placed down on a flat surface, here the right side 806 of the electronic device 100 is placed upon the flat surface. Accordingly, the gravity direction (503) pulls downward through the right side 806 of the electronic device 100. The one or more processors (116) of the electronic device 100 now operate the electronic device 100 in yet another predefined mode of operation 807. In this illustrative embodiment, the predefined mode of operation 807 is a docked mode of operation. A series of selectable windows 808 appear on the display 102 in addition to the time of day. Different manufacturers will have different display presentations when in the docked mode. The presentation of FIG. 8 is illustrative only.

Figure 9:
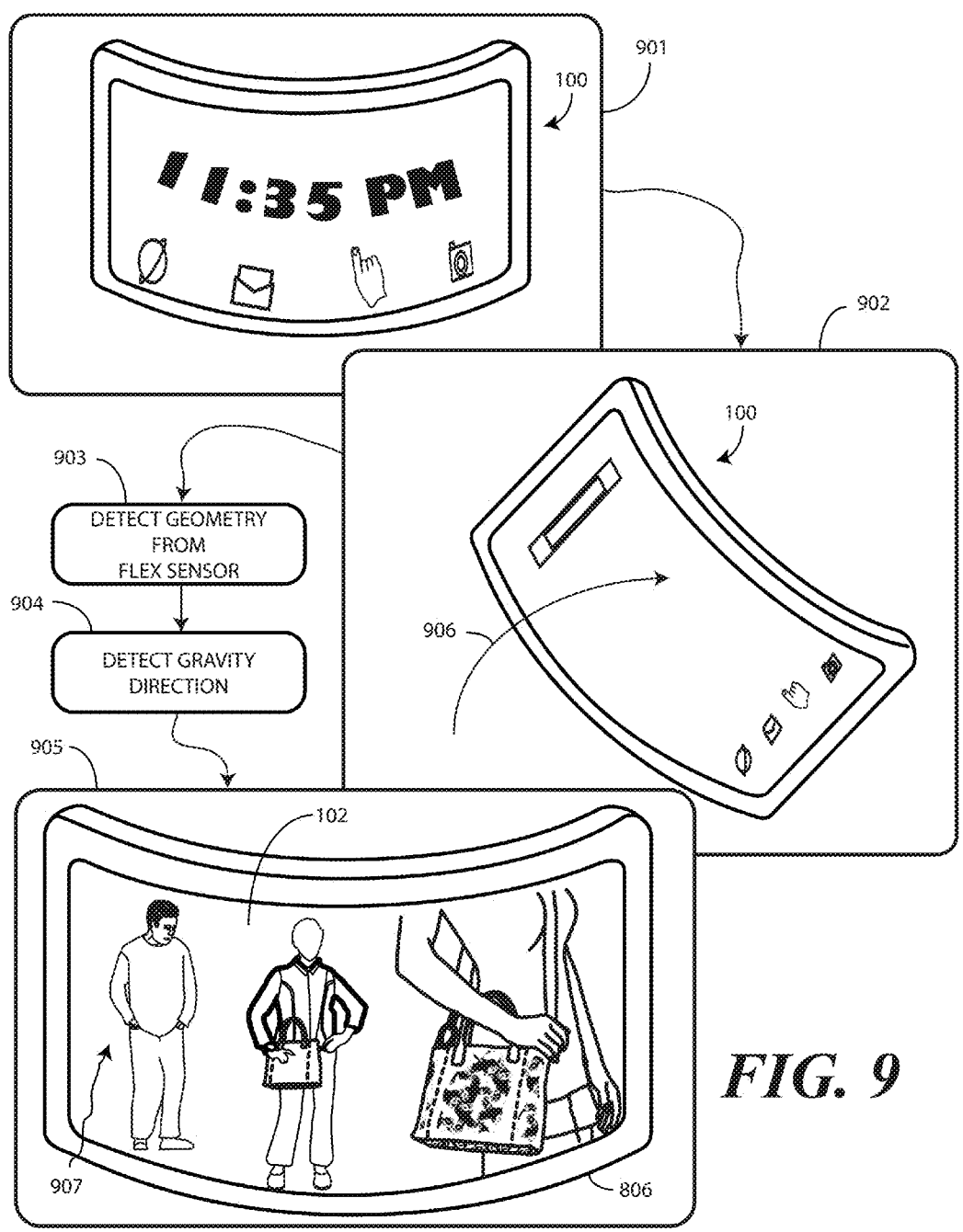
FIG. 9 illustrates another explanatory method of controlling an electronic device in accordance with one or more embodiments of the disclosure.

In one or more embodiments, the modes that correspond to a particular orientation or a particular geometry are user definable. For instance, some users may not employ a docked mode as frequently as other modes. Thus, they may prefer to define that a first mode of operation is an alarm clock mode while another is a movie player, and so forth. Turning now to FIG. 9, illustrated therein is one such example.

At step 901, the electronic device 100 is shown in the convex geometry configuration, with the left side 506 placed down on a flat surface. Accordingly, the deformed geometry (402) is convex and the gravity direction (503) pulls downward through the left side 506 of the electronic device 100. As described above with reference to FIG. 6, and as the user has defined an alarm clock mode as a predefined mode, the one or more processors (116) of the electronic device 100 in the alarm clock mode as a function of the deformed geometry (402) occurring after the bending operation (301) and the gravity direction (503).

At step 902, a user changes 906 the orientation of the electronic device 100. At step 903, the one or more processors (116) of the electronic device 100 detect (403) the geometry of the electronic device 100. Here, the change 906 in the orientation did not affect the geometry.

At step 904, the one or more processors (116) determine (801) the gravity direction (503) relative to the electronic device 100. Here, the electronic device 100 has been rotated 180 degrees out of phase between step 901 and step 905. The one or more processors (116) detect this at step 904.

As shown at step 905, the electronic device 100 is still in the convex geometry configuration of step 901. However, here the right side 806 of the electronic device 100 is placed upon the flat surface. Accordingly, the gravity direction (503) pulls downward through the right side 806 of the electronic device 100. As the user has defined the mode of operation corresponding to this orientation to be a movie player mode, the one or more processors (116) of the electronic device 100 now operate the electronic device 100 in yet another predefined mode of operation 907 in which a movie is presented along the display 102.

While the steps of FIGS. 8 and 9 detected changes in the gravity direction (503), the one or more processors (116) could also detect changes in geometry or combinations of changes in geometry. Illustrating by example, the change 906 occurring at step 902 could have been in response to a bending operation (301) rather than to an orientation change. This would have been detected at step 903 rather than step 904. If the change 906 included both a bending operation (301) and an orientation change, each would have been detected at step 903 and step 904. Accordingly, in one or more embodiments the one or more processors (116) can detect at step 904, with the one or more sensors, a change in the gravity direction and can change the predefined mode of operation to another predefined mode of operation in response to the change in the gravity direction. Alternatively, the one or more processors (116) can detect at step 903, with the one or more sensors, another bending operation to change the geometry of the electronic device 100 and can change the predefined mode of operation to another predefined mode of operation in response to the change in the geometry of the electronic device 100. Of course, combinations of the two can be detected as well at step 903 and step 904 to change the mode of operation.

Figure 10:
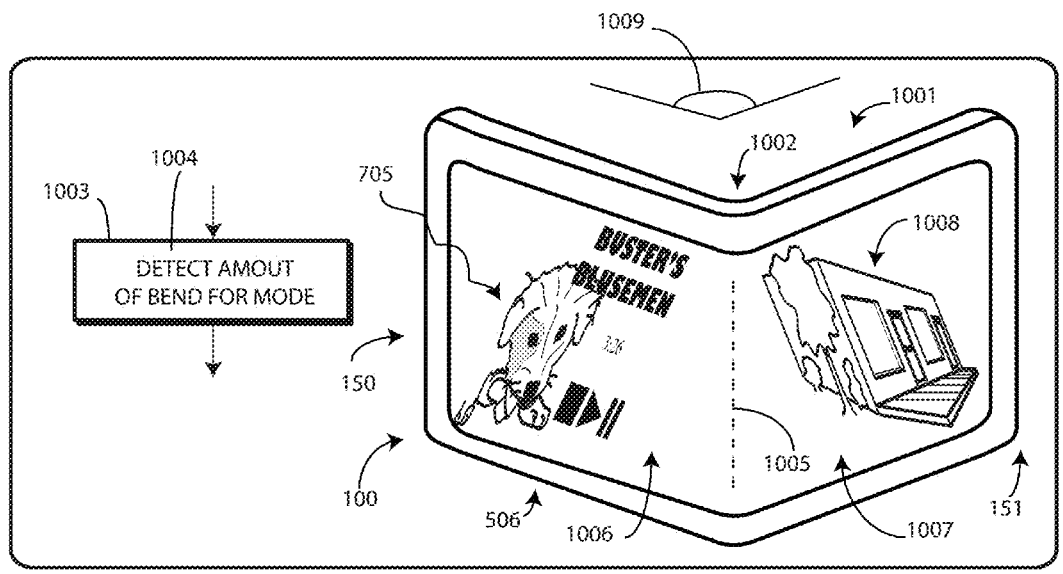
FIG. 10 illustrates an explanatory configuration of an electronic device and one or more method steps in accordance with one or more embodiments of the disclosure.

Turning now to FIG. 10, illustrated therein are additional features of embodiments of the disclosure. As shown in FIG. 10, rather than being convex or concave, the electronic device 100 has been deformed by a bending operation (301) into a folded configuration 1001 having a single fold 1002. The folded configuration 1001 of this illustrative embodiment is that of a card folded into a "tent." While the electronic device 100 is shown being placed on its left side 506, it could alternately have been placed with the display 102 facing upward with the first end 150 and the second end 151 facing downward as well.

In one or more embodiments, as shown at step 1003, when the electronic device 100 is in the folded configuration 1001, the one or more processors (116) are operable to detect 1004 the number of folds in the electronic device 100 resulting from the bending operation (301). In one embodiment, after determining the number of folds, the one or more processors (116) can partition 1005 the display 102 of the electronic device 100 as another function of the one or more folds. Since there is a single fold 1002 here, in this embodiment the display 102 has been partitioned into a first portion 1006 and a second portion 1007.

In one embodiment, when the display 102 is partitioned into at least a first portion 1006 and a second portion 1007, the one or more processors (116) can cause multiple operating modes to be operational simultaneously. Said differently, in one embodiment the predefined mode of operation comprising at least a first mode of operation and at least a second mode of operation, with a first output of the at least the first mode of operation presented on the at least the first portion 1006 of the display 102 and a second output of the at least the second mode of operation on the at least the second portion 1007 of the display 102. Here, an output of the multimedia mode of operation 705 is being presented on the first portion 1006 of the display 102, while a slide show mode 1008 is being presented on the second portion 1007 of the display 102. In another embodiment, a keyboard may be presented on the first portion 1006 of the display 102, while the output of an application or operating system environment is presented on the second portion 1007 of the display 102. Advantageously, such an embodiment where a fold 1002 launches complimentary functions, a user can bend the electronic device 100 like a laptop computer to use the first portion 1006 of the display 102 as a keyboard and the second portion 1007 of the display as a monitor.

FIG. 10 also illustrates another feature of one or more embodiments of the disclosure. As shown at step 1003, in one embodiment the one or more processors (116) can detect 1004 an amount 1009 of bending to determine which modes of operation should be presented on the display. Illustrating by example, in the embodiment of FIG. 10 the amount 1009 of the single fold 1002 is about sixty degrees. This may result in an output of the multimedia mode of operation 705 is being presented on the first portion 1006 of the display 102, while a slide show mode 1008 is being presented on the second portion 1007 of the display. However, by changing this amount 1009, the modes of operation can change. For example, transitioning the amount 1009 to about thirty degrees may result in a mode change, such as an output of the alarm clock mode being presented on the first portion 1006 of the display 102, while an output of a white noise machine mode is presented on the second portion 1007 of the display 102.

Turning now to FIG. 11, illustrated therein are still more features of embodiments of the disclosure. As shown in FIG. 11, rather than being convex or concave or folded, the electronic device 100 has been deformed by a bending operation (301) into a multi-folded configuration 1101 having a three folds 1102, 1103, 1104. In this illustrative embodiment, after determining the number of bends 1108, the one or more processors (116) can partition 1105 the display 102 of the electronic device 100 as another function of the one or more folds. Here the display 102 has been partitioned 1105 into four portions.

As shown at step 1106, in one embodiment the one or more processors (116) can detect 1107 a number of bends 1108 and then select modes as a function of the number of bends 1108. For example, some modes may be complementary. A slideshow may accompany music. Thus, in a single bend configuration one portion of the display 102 may be a slide show mode (1008) while another is a multimedia player. By contrast, when three folds 1102, 1103, 1104 are in place, the modes may be different. Four partitions may present a calendar mode, a time of day mode, a weather mode, and a social media mode, just to illustrate one "command center" mode by example.

Embodiments of the disclosure contemplate that users employ electronic devices in one of three key states: device in-hand; device in a docked mode, such as at a car docking station or desk docking station; and "out of hand," such as lying on a flat surface. Embodiments of the disclosure provide unique ways of allowing a user to control the mode of operation when in this third, out of hand state.

Embodiments of the disclosure also contemplate that when prior art devices are placed on flat surfaces such as tables or nightstands, their displays are frequently difficult to view. Advantageously, embodiments of the disclosure provide bendable devices that are easily stood on their sides for increased display viewability.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while bending was the primary mode of changing a geometry of an electronic device, other techniques, including squeezing, stretching, pulling, and shaking could also be used.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for controlling an electronic device, comprising:
    detecting, with one or more sensors, at least:
        a bending operation occurring to deform the electronic device;
        one or more folds in the electronic device after the bending operation;
        a geometry of the electronic device after the bending operation; and
        a gravity direction;
    partitioning a display of the electronic device as a function of the one or more folds into at least a first portion and a second portion, wherein the first portion and the second portion are on different sides of a fold; and
    operating, by one or more processors configured to operate with the one or more sensors, the electronic device in a predefined mode of operation as another function of the geometry after the bending operation and the gravity direction, wherein the predefined mode comprises a first mode of operation and a second mode of operation, with a first output of the first mode of operation is presented on the first portion and a second output of the second mode of operation is presented on the second portion.

2. The method of claim 1, further comprising:
    detecting, with the one or more sensors, a change in the gravity direction; and
    changing, with the one or more processors, the predefined mode of operation to another predefined mode of operation in response to the change in the gravity direction.

3. The method of claim 2, the another predefined mode of operation different from the predefined mode of operation.

4. The method of claim 1, further comprising:
    detecting, with the one or more sensors, another bending operation to change the geometry of the electronic device; and changing, with the one or more processors, the predefined mode of operation to another predefined mode of operation in response to the change in the geometry of the electronic device.

5. The method of claim 1, the detecting the gravity direction comprising detecting a meaningful acceleration, defined by a difference of a moving acceleration value and an instantaneous acceleration value, is zero for a set number of predetermined cycles.

6. The method of claim 5, the detecting the gravity direction further comprising determining a moving average of acceleration values for the electronic device, determining an acceleration due to gravity, and subtracting the acceleration due to gravity from the moving average of acceleration values.

7. The method of claim 6, the geometry comprising a multifold geometry.

8. The method of claim 1, the first output comprising a laptop keyboard presentation, the second output comprising a laptop monitor presentation.

9. The method of claim 1, the predefined mode of operation comprising a docked mode of operation.

10. The method of claim 1, the geometry of the electronic device comprising a convex geometry.

11. The method of claim 1, the geometry comprising a folded geometry.

12. An electronic device, comprising:
a housing;
one or more processors;
a display, configured to operate with the one or more processors;
one or more flex sensors, configured to operate with the one or more processors; and
a gravity sensor, configured to operate with the one or more processors;
the one or more processors to:
 detect a bending operation, with the one or more flex sensors, deforming one or more of the housing or the display into a deformed geometry;
 determine a gravity direction, with the gravity sensor, after the bending operation; and
 operate the electronic device in a predefined mode of operation as a function of both the deformed geometry and the gravity direction, wherein the predefined mode of operation comprises an operating system environment selected from a multi-OS environment;
 the operating system environment selected from a multi-OS environment comprising enhanced data usage rate compared to another operating system environment selected from the multi-OS environment.

13. The electronic device of claim 12, the one or more flex sensors comprising at least a first conductive layer, a second conductive layer, and a resistive layer disposed between the first conductive layer and the second conductive layer.

14. The electronic device of claim 12, the gravity sensor comprising a barometer.

15. The electronic device of claim 12, the housing comprising a flexible housing, and the display comprising a flexible display.

16. The electronic device of claim 12, the one or more processors further to:
 additionally determine, with the gravity sensor, a change in the gravity direction; and
 alter the predefined mode of operation to another predefined mode of operation in response to the change in the gravity direction.

17. The electronic device of claim 12, the one or more processors further to:
 also detect, with the one or more flex sensors, another bending operation to change the deformed geometry of the electronic device; and
 alter the predefined mode of operation to another predefined mode of operation in response to the change in the deformed geometry of the electronic device.

18. The electronic device of claim 12, the predefined mode of operation comprising presenting a multimedia presentation on the display.

19. The electronic device of claim 12, the one or more processors further to identify, with the one or more flex sensors, a number of bends in the housing and to partition the display as another function of the number of bends.

* * * * *